United States Patent
Dubois

(10) Patent No.: US 7,093,537 B2
(45) Date of Patent: Aug. 22, 2006

(54) BALE EJECTION ARRANGEMENT FOR LARGE SQUARE BALER

(75) Inventor: Jean-Yves Dubois, Cresancey (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/037,714

(22) Filed: Jan. 18, 2005

(65) Prior Publication Data

US 2005/0172838 A1    Aug. 11, 2005

(30) Foreign Application Priority Data

Jan. 20, 2004    (DE) .................. 10 2004 002 730

(51) Int. Cl.
*B30B 9/30* (2006.01)
*B30B 15/32* (2006.01)

(52) U.S. Cl. .................. 100/188 R; 100/218; 198/746

(58) Field of Classification Search .............. 100/7, 100/144, 179, 188 R, 218; 56/341; 198/750.1, 198/750.14, 736, 746; 414/390, 395
See application file for complete search history.

(56) References Cited

U.S. PATENT DOCUMENTS

| | | | |
|---|---|---|---|
| 845,625 A | * | 2/1907 | Field .......................... 100/144 |
| 2,964,126 A | * | 12/1960 | Peterson .......................... 96/28 |
| 3,184,044 A | * | 5/1965 | Allen et al. .................. 198/746 |
| 4,549,840 A | * | 10/1985 | Ansbjer ...................... 414/24.5 |
| 4,603,770 A | * | 8/1986 | Hartness .................. 198/345.3 |
| 4,791,865 A | * | 12/1988 | Naaktgeboren ............. 100/218 |
| 5,540,144 A | * | 7/1996 | Schrag et al. ........... 100/188 R |

FOREIGN PATENT DOCUMENTS

WO    WO 96/29195    3/1996

* cited by examiner

*Primary Examiner*—Derris H. Banks
*Assistant Examiner*—Jimmy T. Nguyen

(57) ABSTRACT

A baler having a baling chamber of rectangular cross section includes a bale ejection arrangement that is mounted adjacent a bottom wall of a rear section of the baling chamber. The bale ejection arrangement comprises a plurality of transversely spaced, upper and lower pairs of laths. The upper and lower pairs of laths are interconnected by triangular shaped conveyor elements that are retracted from the baling chamber when the upper and lower pairs of laths abut each other. An extensible and retractable hydraulic actuator is coupled for simultaneously effecting longitudinal shifting movement of each of the lower pairs of laths, and as the actuator extends, the conveyor elements first raise into the baling chamber and then the upper and lower pairs of laths are moved as a unit so that any crop located in the baling chamber is advanced to the rear and removed from the baling chamber.

9 Claims, 3 Drawing Sheets

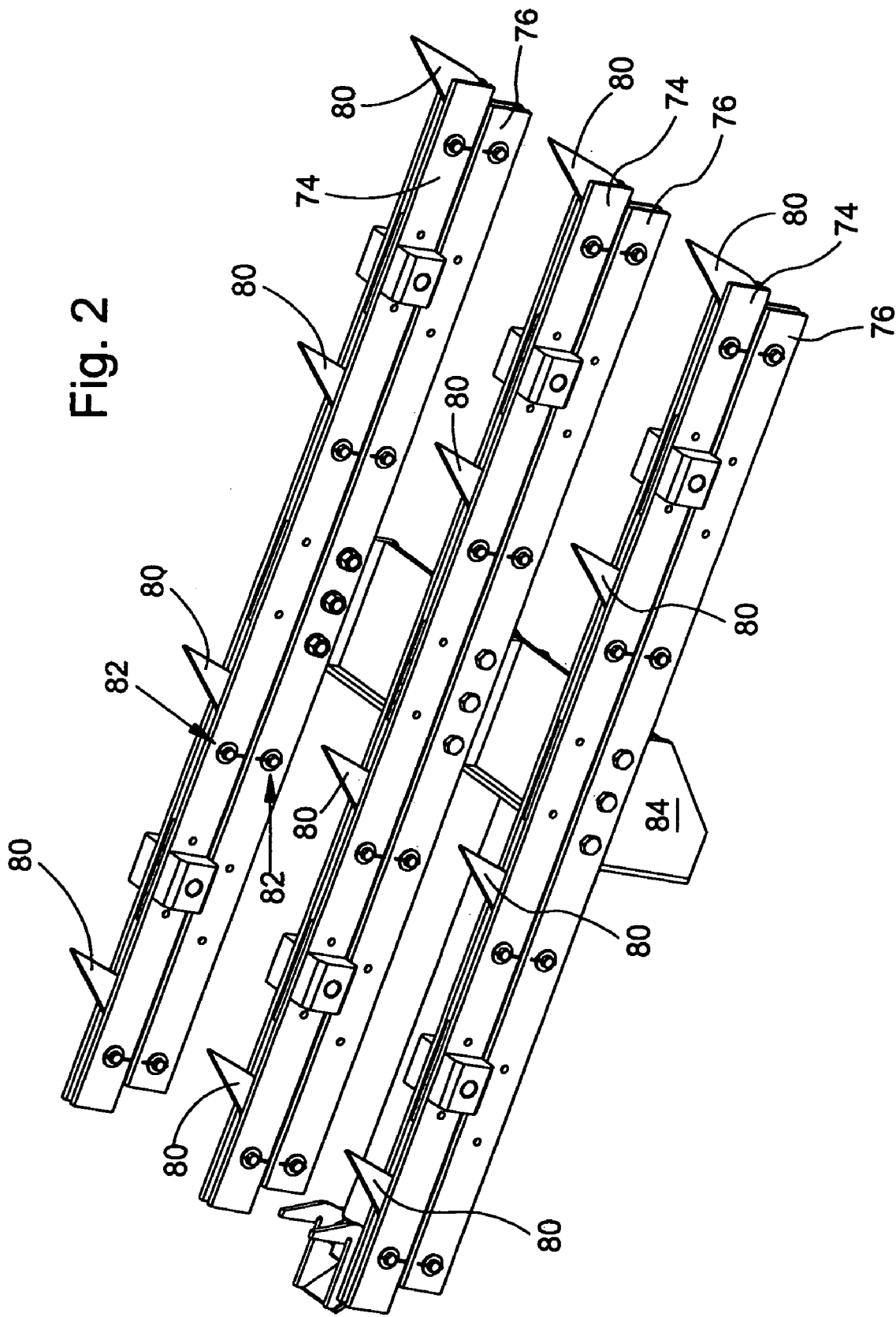

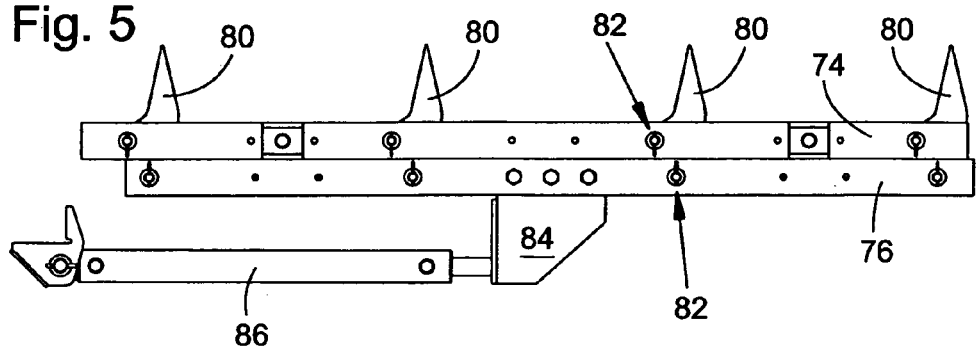
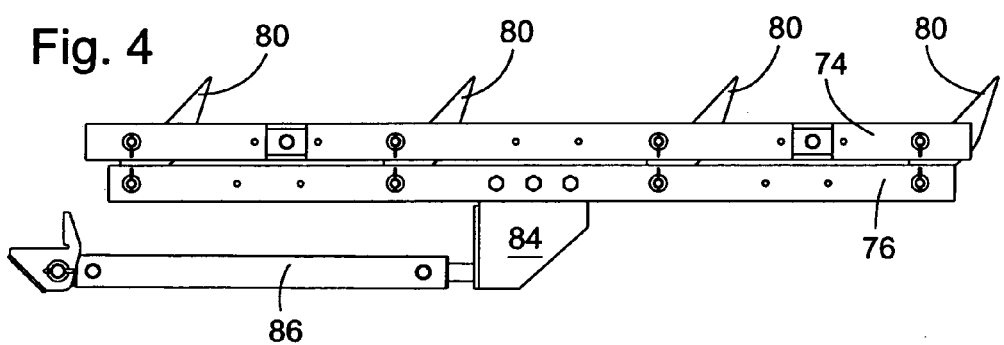
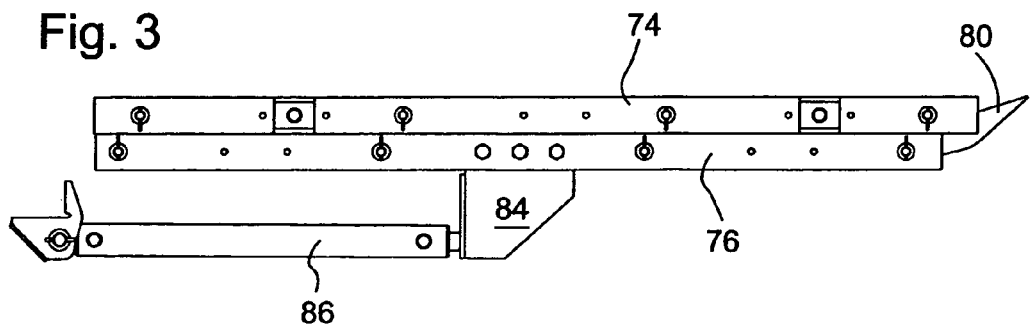

BALE EJECTION ARRANGEMENT FOR LARGE SQUARE BALER

FIELD OF THE INVENTION

The invention concerns a baler with a rectangular or slab-shaped baling chamber and a bale ejection arrangement with at least once conveyor element that can be shifted in the longitudinal direction of the baling chamber by means of a motor that can occupy at lest one first position, in which it is arranged at least generally outside of the baling chamber, and a second position in which it projects into the baling chamber.

BACKGROUND OF THE INVENTION

WO-A96 29 196 shows a baler with a bale ejection arrangement for the ejection of bales from a baling chamber. The ejection arrangement is equipped with conveyor elements that can be brought out of a first position, in which the conveyor elements are arranged outside of the baling chamber, into a second position in which the conveyor elements project into the baling chamber by means of spring action, in order to engage a bale.

The problem underlying the invention is seen in the fact that the conveyor elements of such bale ejection arrangements on balers do not project into the bale or project only to an inadequate degree and do not convey the bale or do so non-uniformly, or that damage to the bale can result from jams, for example, in the form of wet harvested crop, branches, stones etc. due to particularly densely compressed bales or metal fatigue of the spring.

SUMMARY OF THE INVENTION

According to the present invention, there is provided an improved bale ejection arrangement for ejecting crop from the baling chamber of a large square baler.

An object of the invention is to provide a large square baler with a bale ejection arrangement that mounted adjacent a baling chamber and includes conveyor elements which normally are located outside the baling chamber but which may be moved into and shifted to the rear within the baling chamber so as to remove crop located there.

In this way, a bale ejection arrangement is made available which is equipped with conveyor elements that securely engage or are inserted into the bale that is to be conveyed. Such a bale ejection arrangement is provided on a baler having a slab-shaped or rectangular cross section baling chamber. A baler of this type may be an industrial baler, for example, for baling paper, woven textiles or cloth, garbage etc., but in particular for a baler for agricultural harvested crop, for example, in the form of a large square baler. The bale ejection arrangement is provided with at least one conveyor element that can be shifted in the longitudinal direction of the baling chamber by means of a motor, the conveyor element occupying at least a first position, in which it is arranged at least generally outside of the baling chamber and a second position in which it projects into the baling chamber. In the first position, it does not interact with the material in the baling chamber or with a bale arranged there or it does not engage or is inserted into such a bale, and thereby does not offer any restriction to the flow of the harvested crop or to the transport of a bale during a normal baling operation. In its second position, the conveyor element projects into the baling chamber and thereby engages the material or the bale, or is inserted into it in order to transport it out of the baling chamber or to eject it. The conveyor element can be moved by the motor not only in the longitudinal direction but can also be brought from its first position into its second position. This motorized actuation provides the assurance that the conveyor element can completely engage into the bale or the material located in the baling chamber, even in the case of an obstruction, a jam or the like, in order to remove it completely from the baling chamber or in the case of a wrapped bale with a minimum of damage or free of damage.

If the bale ejection arrangement is provided with at least two laths that are at least generally parallel to each other, then the conveyor element can be moved by being connected to one or both of the laths and the laths are moved with respect to each other or are shifted relative to each other. The movement of the conveyor element out of its first and into its second position can be performed in a simple way by the same motor, in that the conveyor element is connected in joints to the first of the laths as well as to a second lath and thereby upon a shifting of the laths against each other is erected relative to the laths or in order to be brought into an at least generally vertical position.

In order to move the lath or the laths or the conveyor element, the motor can interact with one of the laths or engage one of the laths directly or indirectly, for example, over one or more linkages or gearboxes.

Provision can be made for the laths to be provided alongside each other or at least generally adjoining each other horizontally. The least possible space requirement and a favorable course of movement of the conveyor element results in the case that it is connected in joints to the first as well as to the second lath and thereby describes a curve upon a shifting of the laths relative to each other if the laths are arranged at least generally adjoining each other vertically or arranged one above the other.

If the laths are arranged adjoining vertically or one above the other, then the motor preferably engages the lower of the two laths, since in this way intervening levers or linkages can be omitted without the motor necessarily being arranged in close proximity to the baling chamber or a floor of that chamber, which could lead to impediments or limitations of the construction space or the dimensions of the motor.

The motor could be configured, for example, in the form of an electric motor or any other appropriate motor. The use of a hydraulic motor, however, is particularly favorable, since balers or towing vehicles towing these are frequently provided with sources of hydraulic pressure that are usually appropriate to supply this additional hydraulic motor with hydraulic pressure.

In order to assure a uniform bale ejection or a uniform ejection of material, and to counteract any damage to the bale due to an excessive force at a localized point and in order to accelerate the ejection process by reducing the necessary ejection strokes, the bale ejection arrangement can be provided with several conveyor elements. The conveyor elements can be provided offset in the baling chamber or at one or more surfaces of the baling chamber, such as, for example, the floor of the baling chamber. But a simple drive without the use of gearboxes etc. by the motor results from the conveyor elements being arranged in one or more rows extending in the direction of the ejection of the bale.

Each row can be associated with a first and a second lath, where the laths can be connected, for example, in such a way that they can be moved in unison by the motor, in that they are, for example, connected by a transverse strut that may be bolted, welded or the like.

If the laths are provided so that they can be slid in the longitudinal direction of the baling chamber, then in addition to the movement of the conveyor element in the baling chamber and out of it, the actual ejection movement of the conveyor element can be performed by a movement of the laths, preferably by means of the motor. This can be accomplished by first shifting the laths relative to each other so as to move the conveyor element in the baling chamber or out of the latter, in order to be moved further subsequently in the direction of the baling chamber, so that the conveyor element performs an ejection movement and the bale is transported in the direction of an outlet opening of the baling chamber.

BRIEF DESCRIPTION OF THE DRAWINGS

The drawing shows an embodiment of the invention that shall be described in greater detail in the following.

FIG. 2 shows a perspective plan view of the bale ejection arrangement by itself.

FIG. 3 through 5 show side views of the bale ejection arrangement with conveyor elements that are located in various positions.

DESCRIPTION OF THE PREFERRED EMBODIMENT

Figure 1:
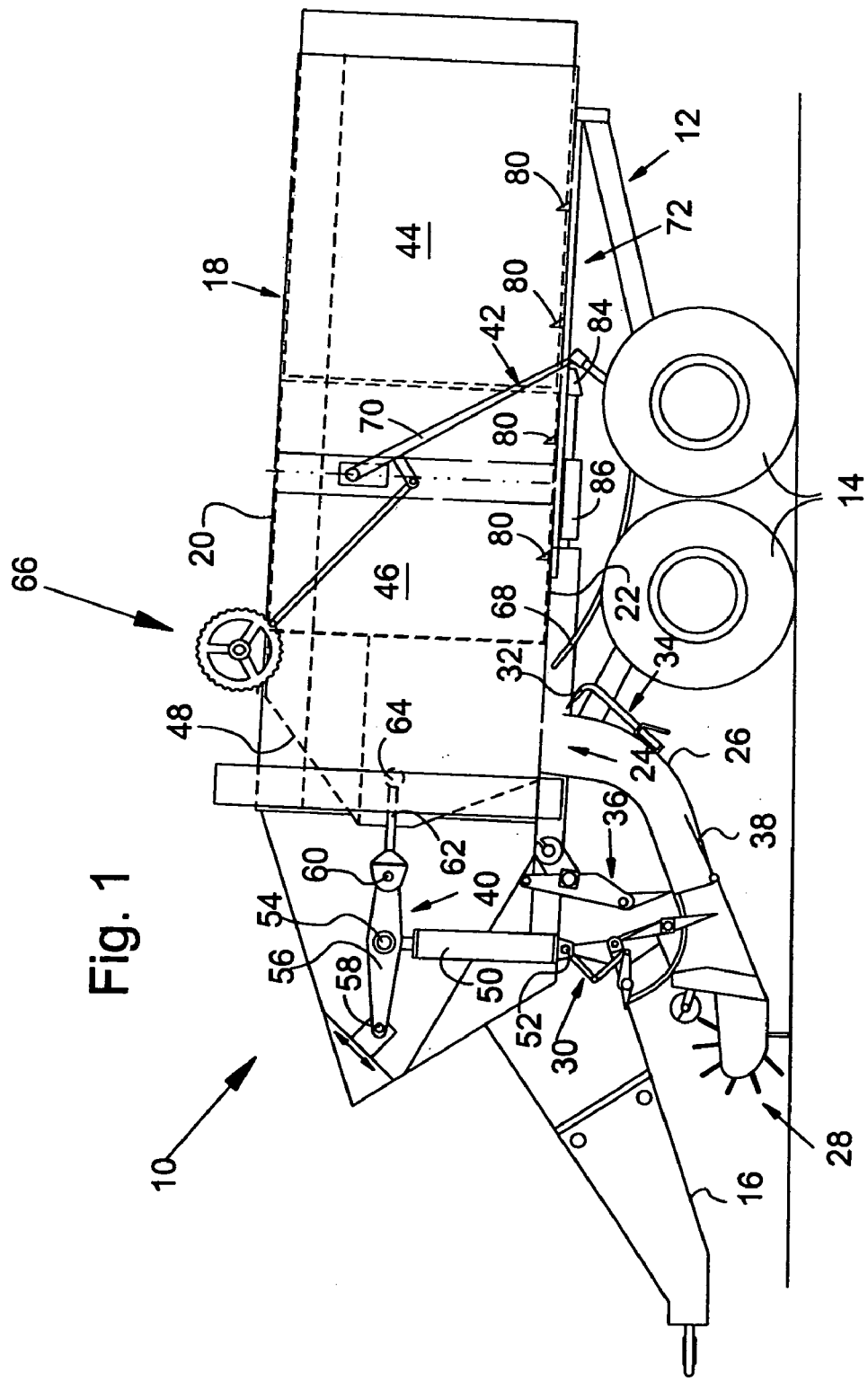
FIG. 1 shows a schematic side view of a baler according to the invention with a bale ejection arrangement.

FIG. 1 shows a baler 10 in the form of a large baler for the production of slab-shaped bales that contains a frame 12 that is supported on ground support wheels 14 in tandem arrangement. A towbar 16 is connected to the frame 12 and extends from the latter to the front and is configured in such a way that it can be connected to a towing vehicle such as an agricultural tractor, not shown, which is equipped with a power take-off shaft in order to deliver power to drive various driven components of the baler 10. A baling chamber 18 or an enclosure with rectangular cross section is formed in part by an upper housing wall 20 and a lower housing wall 22, where the lower housing wall 22 is provided with a crop inlet opening 24, to which a curved supply channel 26 is connected, that is used as a rough pressing chamber, as is described in the following. A take-up arrangement 28 in the form of a pick-up with a screw conveyor conveying to the center is arranged ahead of the supply channel 26 in order to raise a swath of harvested crop from the ground and to deliver it to a compression fork 30, that is used to compress harvested crop into the supply channel 26, until a load of predetermined density has been collected downstream of fingers 32 of a retention arrangement 34, where the retention arrangement 34 is mounted so as to pivot between a retention position, in which the fingers 32 project into the supply channel 26 in the vicinity of the crop inlet 24, and a supply position, in which the fingers 32 are withdrawn from the supply channel 26, as shown in FIG. 1, in order to permit the load of harvested crop to be pushed across the crop inlet 24 by means of a loader fork assembly 36 into the baling chamber 18. A spring-loaded flap 38 is mounted, free to pivot, at a forward, lower location of the supply channel 26, that pivots as a function of the harvested crop located in the supply channel 26, when the crop reaches a predetermined density, in order to supply an electric control circuit (not shown) with current, which provides corresponding drive connections that at first brings about a movement of the retention arrangement 34 in such a way that it retracts the fingers 32 out of the blocking position into the position shown in FIG. 1 and then activates the loader fork assembly 36 in such a way that thereupon the loader fork assembly 36 can slide through the supply channel 26 and can move the load of harvested crop into the baling chamber 18. Once the load of harvested crop has been pushed into the baling chamber 18, a piston mechanism 40, arranged at a forward end of the frame 12, is actuated in a controlled sequence after the loader fork assembly 36, in order to move the harvested crop to the rear into the baling chamber 18, where it is compressed in a stack, as this is well known in the state of the art. After the stack of compressed material has reached a predetermined length, a needle assembly 42, including several curved needles 68 for the delivery of wrapping yarn, is actuated, so as to conduct several strands of yarn to a corresponding number of knot-tying devices, not shown, that operate in such a way that they lay lengths of yarn around the predetermined length of the stack, in order to form a bale 44 that is ready for unloading, which occurs when it is forced out of the rear end region of the baling chamber 18 by a partial bale 46, when it increases in its length, since new loads of harvested crop are pushed into the baling chamber 18.

If reference is now made to the details of the piston mechanism 40, it can be seen that the latter includes a baling piston 48 that is arranged for a back-and-forth movement in the baling chamber 18 between a retracted position ahead of the crop inlet 24 and an extended position beyond the crop inlet 24. This movement of the baling piston 48 has the result that loads of harvested crop that are introduced into the baling chamber 18 from the supply channel 26, are compressed against a stack of harvested crop that includes a partial bale 46 and/or the complete bale 44. Moreover the piston mechanism 40 includes a drive 50 configured as an extendible and retractable actuation arrangement, which is pictured here as a double-acting hydraulic cylinder and piston unit, whose cylinder end is anchored by a pin 52 to the frame 12, free to pivot, at a point above the compression fork 30. The piston end of the drive 50 is connected at a connecting point 54, perhaps with a pin, at a point between opposite ends of a first steering arm 56, used as a crank arm, whose forward end region is connected at a bearing location 58, free to pivot, to the frame 12. A rear end region of the first steering arm 56 is connected in a bearing location 60, perhaps by a pin, to a forward end region of a second steering arm 62 operating as connecting rod, whose rear end region is connected in a bearing location 64 to the baling piston 48, perhaps by a pin. It should be noted here that, when the baling piston 48 is at its rearmost position, as shown in FIG. 1, the pins connecting the bearing locations 58 and 64 are arranged along a line of centers that lies along or approximately along a central longitudinal axis of the baling chamber 18. This has the result that the reaction force of the harvested crop, that acts upon the baling piston 48 is generally absorbed by the drive 50 when the first and the second steering arms 56 and 62 are located along a line which is the case when the baling piston 48 is in its rear end position. Furthermore it should be noted that each of the two steering arms 56 and 62 could be configured as a pair of steering arms spaced at a distance from each other in the transverse direction. Then the drive 50 could be connected at the connecting point 54 (pin) at a location between the pair of steering arms 56 that form the first steering arm 56. Therefore it can be seen that the baling piston 48 forms the slider of a slider-crank mechanism that includes the first steering arm 56 as a crank arm, and the second steering arm 62 as the connecting rod. Although the linkage formed by the steering arms 56 and 62 does not move beyond a dead center position, it could be characterized as a toggle mechanism or toggle joint. Although the preferred embodiment shows a drive 50 that is connected to the first steering arm 56 at a point between the opposite ends of the steering arm 56, the drive could furthermore be connected at any point between the bearing location 58 and the bearing location 64, for example, the drive 50 could be connected to the pin 60 or at a point along the length of the second steering arm 62, where the operation could be improved over the known configuration, in which the actuating arrangement is connected directly to the baling piston 48.

Further details of this baler 10 are described in EP-A2-0 940 072, whose disclosure is incorporated herein. It should be noted that in place of this special drive with a hydraulic motor, a conventional crank drive could be used.

The piston mechanism 40 contains the baling piston 48 that can be slid between two end positions by means of the drive 50 as is described by EP-A2-0 940 072.

The bearing location 58 for the control of the first steering arm 56 is configured in such a way that it can be repositioned in its height as well as in the longitudinal direction of the baling chamber 18, for example, on an inclined plane, so that each of the two steering arms 56, 62 in their extended position extend in the longitudinal center plane of the baling chamber 18. Indeed, this is only a preferred embodiment that can be omitted here. Depending on the configuration of the guidance of the baling piston 48, the two steering arms 56 and 62 can also engage offset to the center of the baling chamber 18, that is, the bearing location 58 of the steering arm 56 is unchanged.

A knot-tying assembly 66 is provided in known manner on the upper side of the upper housing wall 20 and to the rear of the supply channel 26, into which the needles 68 of the needle assembly 42 can enter. The needle assembly 42 includes, on each side, a needle carrying arm 70 that can pivot in a vertical plane and conducts the needles 68 through the baling chamber 18 with the yarn, not shown, to the knot-tying assembly 66 as soon as a bale 44 is to be wrapped.

Moreover the lower wall 22 of the baling chamber 18 is arranged in a conventional configuration as a steel sheet metal part, if necessary, profiled, which extends over the entire length of the baling chamber 18 and is arranged as a stationary component on the frame 12. The wall 22 is provided with the crop inlet 24 for the supply channel 26 and an opening for the entry of the needles 68. In a rear region of the baling chamber 18, flaps that can be repositioned can be provided in known manner, which offer the bale 44 a certain resistance to movement.

A bale ejection arrangement 72 is provided underneath the wall 22. As can best be seen in FIGS. 2–5, the bale ejection arrangement includes several pairs of metal laths or strips 74 and 76, respectively extending in the longitudinal direction of the baling chamber 18. The pairs of laths 74 and 76 are arranged in parallel rows, where in the embodiment shown three rows, a central row and a left and a right row, are distributed uniformly over the width of the baling chamber 18. Each row is provided with a first pair of laths 74 and a second pair of laths 76, where the first pair of laths 74 are arranged vertically above the second pair of laths 76.

In the present embodiment, the pairs of laths 74 and 76 of each row are spaced from each other a short distance so as to define a slot in which a multitude of conveyor elements 80 are provided. Each of the conveyor elements 80 is connected in joints to the upper and the lower laths 74, 76 at connecting points 82. In the region of the laths 74, 76 and the conveyor elements 80, the bottom wall 22 of the baling chamber 18 is configured as a slotted component in such a way that the conveyor elements 80 can enter into and retract from the baling chamber 18 or can be moved relative to it, as is described in greater detail in the following.

As can be seen best in FIGS. 3 through 5 in connection with FIG. 2, the lower laths 76 are rigidly connected to each other by means of a bracket 84. This bracket 84 engages a motor 86 in the form of a hydraulic cylinder extending in the longitudinal direction of the baling chamber 18, the other end of the hydraulic cylinder is connected in a joint to the frame 12, with the hydraulic cylinder 86 preferably being double-acting.

In the following, the operation of the bale ejection arrangement 72 shall now be described in more exact detail.

During the normal operation of the baler 10, the bale ejection arrangement 72 is deactivated and is located in its position shown in FIG. 3, in which the motor 86 or the piston of the hydraulic motor is retracted and the conveyor elements 80 are in a position in which they do not project into the baling chamber 18 and thereby do not interfere with the transport of the bale by the baling piston 48. The connecting points 82 of the conveyor elements 80 on the pairs of laths 74 and 76 are spaced away from each other in the vertical direction, whereby the connecting point 82 on each of the lower pairs of laths 76 is arranged to the rear of the connecting point 82 on each of the upper pairs of laths 74 with respect to the baling chamber 18.

If a bale 44 or a partial bale 46, located in the baling chamber 18, is to be removed from the latter, for example, after the conclusion of the harvesting operation or for purposes of maintenance or repair, then an operator will activate the bale ejection arrangement 72. This activation can be performed, for example, by a control arrangement provided on the baler or on a towing vehicle connected to the baler. This control arrangement controls the motor 86 or connects the hydraulic motor to a pressure source, not shown, on the baler 10 or on the towing vehicle.

If the motor 86 is activated or if it is supplied with hydraulic pressure in such a way that its piston is extended relative to the cylinder, then each of the lower pairs of laths 76, which are connected to the motor 86 over the bracket 84, are moved away from the baling piston 48 in the direction of the rear region of the upper housing wall 20. Due to the action of the motor 86, the lower pairs of laths 76 are moved to the rear relative to the upper pairs of laths 74, as a result of which the connecting points 82 first approach each other in the horizontal direction (transition from the first end position shown in FIG. 3 to that shown in FIG. 4) and then pass each other (transition from the intermediate position shown in FIG. 4 to the second end position shown in FIG. 5). The connecting points 82 in the second end position are such that the connecting points 82 of the upper pair of laths 74 is arranged ahead of the connecting points 82 on the lower pair of laths 76, in the embodiment shown. However, a geometry deviating from the above is also possible.

Since the spacing of the connecting points 82 is determined by the rigid conveyor element 80, the horizontal approach of the connecting points 82 towards each other results in an enlargement of the vertical distance, whereby the upper and lower pairs of laths 74 and 76 firs move away from each other during the shifting to the rear (FIG. 4), in order to approach each other again immediately thereafter (FIG. 5).

The movement of the connecting points described here results in a corresponding movement of the conveyor elements 80 in such a way that these are raised from their position arranged outside of the baling chamber 18, a generally non-vertical, non-operating position, into a generally vertical, operating position, in which they project through slots in the bottom wall 22 of the baling chamber 18 and engage into the bale 44 or partial bale 46 arranged there. If the conveyor elements 80 are now in their position projecting into the baling chamber 18, a further operation of the motor 86 or a further extension of the piston of the hydraulic motor has the effect that both pairs of laths 74, 76 are shifted to the rear relative to the baling chamber 18 and that the conveyor elements 80 also slide to the rear in the slots in the chamber bottom wall and convey the bale 44 or the partial bale 46 out of the baling chamber 18.

In order to bring the conveyor elements 80 into their initial position again after the ejection of the bale or for the performance of a renewed ejection stroke, the motor 86 is retracted or the piston of the hydraulic motor is again brought into its retracted position, whereupon the pairs of laths 74, 76 are initially shifted relative to each other and thereby the conveyor elements 80 are brought into their non-operating position and subsequently the pairs of laths 74, 76 are themselves brought into their retracted position.

The arrangement described here provides the assurance that the conveyor elements 80 engage themselves into the bale 44 or the partial bale 46 that is to be ejected, regardless of the question whether it is particularly dense and hence fully compressed or that jams or other impediments exist, since they (conveyor elements 80) are forced actively into the bale 44 or partial bale 46 by the action of the motor 86 and are not loaded by the force of a spring or the like. Beyond that, the conveyor elements 80 are brought again actively into their first position in which they do not project into the baling chamber 18 during the retraction for a renewed ejection stroke when the bale 44 or partial bale 46 are still in the baling chamber 18, before they are retracted relative to the baling chamber 18. In this way, damage to the bale 44 or partial bale 46 that is to be ejected as well as jams caused by broken harvested crop or material are counteracted.

Having described the preferred embodiment, it will become apparent that various modifications can be made without departing from the scope of the invention as defined in the accompanying claims.

The invention claimed is:

1. In a baler having a baling chamber of rectangular cross section having a bottom wall provided with slots that extend longitudinally of bottom wall, and a bale ejection arrangement located beneath the bottom wall and including at least one conveyor element that can be shifted in the longitudinal direction of the baling chamber by means of a motor and that can occupy at least a first position, in which the at least one conveyor element is arranged at least generally outside of the baling chamber, and a second position, in which the at least one conveyor element projects through one of said slots and into the baling chamber, the improvement comprising: said bale ejection arrangement including at least one set of upper and lower longitudinally extending laths; the at least one set of upper and lower laths comprises a pair of said upper longitudinally extending laths arranged vertically directly above a pair of said lower longitudinally extending laths said conveyor element being coupled to each of said upper and lower laths by a single transverse pivot connection and said conveyor element is arranged between said pair of said upper laths and between said pair of said lower laths wherein the pivot connection between said upper lath and the at least one conveyor element is spaced vertically above the pivot connection between the at least one conveyor element and the lower lath so that the upper and lower laths can slide longitudinally relative to each other; and said motor being coupled for shifting one of said laths longitudinally relative to the other thereby effecting movement of said conveyor element from said first to said second position.

2. The baler, as defined in claim 1, wherein, in addition to said one set of upper and lower laths said bale ejection arrangement includes a second set of upper and lower laths constructed identically to said at least one set and being spaced transversely from said at least one set; and at least a second conveyor element being coupled between said second set of upper and lower laths by a single transverse pivot connection associated with each of said upper and lower laths so that relative longitudinal movement is permitted between said upper and lower laths of said second set of upper and lower laths; and said second set of upper and lower laths being coupled to said motor so that said second conveyor element is moved in concert with said at least one conveyor element when said upper laths are moved longitudinally relative to said lower laths.

3. The baler, as defined in claim 2, and further including a beam interconnecting said lower laths; and said motor being coupled to said beam.

4. The baler, as defined in claim 2, wherein the pivot connections between the upper lath of the second set of upper and lower laths and the second conveyor element is spaced vertically above the pivot connection between the second conveyor element and the lower lath of the second set of upper and lower laths.

5. The baler, as defined in claim 1, wherein said upper and lower laths of said at least one set of upper and lower laths are arranged at least generally adjoining one another vertically.

6. The baler, as defined in claim 1, wherein said motor is an extensible and retractable hydraulic motor.

7. The baler, as defined in claim 1, wherein, in addition to said at least one conveyor element, a plurality of conveyor elements are mounted to said upper and lower laths of said at least one set of upper and lower laths in a manner identical to that used for mounting said at least one conveyor element to the upper and lower laths; and said plurality of conveyor elements being spaced longitudinally from each other.

8. The baler, as defined in claim 2, wherein a plurality of conveyor elements are mounted to each of said at least one and second sets of upper and lower laths, with all conveyor elements being mounted in a similar manner and with the conveyor elements respectively associated with the at least one and second sets of upper and lower laths being spaced longitudinally one from another.

9. The baler, as defined in claim 1, wherein the upper and lower laths of said at least one set of upper and lower laths are mounted for a limited longitudinal movement between first and second end points relative to one another; and said motor being coupled for moving said upper and lower laths together as a unit once said limited longitudinal movement has taken place in a given direction longitudinally of said baling chamber, with said at least one set of upper and lower laths and said motor being so located relative to each other that said motor is capable of moving said one set of upper and lower laths to a rearmost position near a rear end of said baling chamber.

* * * * *